Dec. 7, 1948.  J. NADER ET AL  2,455,435
TORQUE AND SPEED RESPONSIVE MECHANISM
Original Filed Sept. 2, 1943
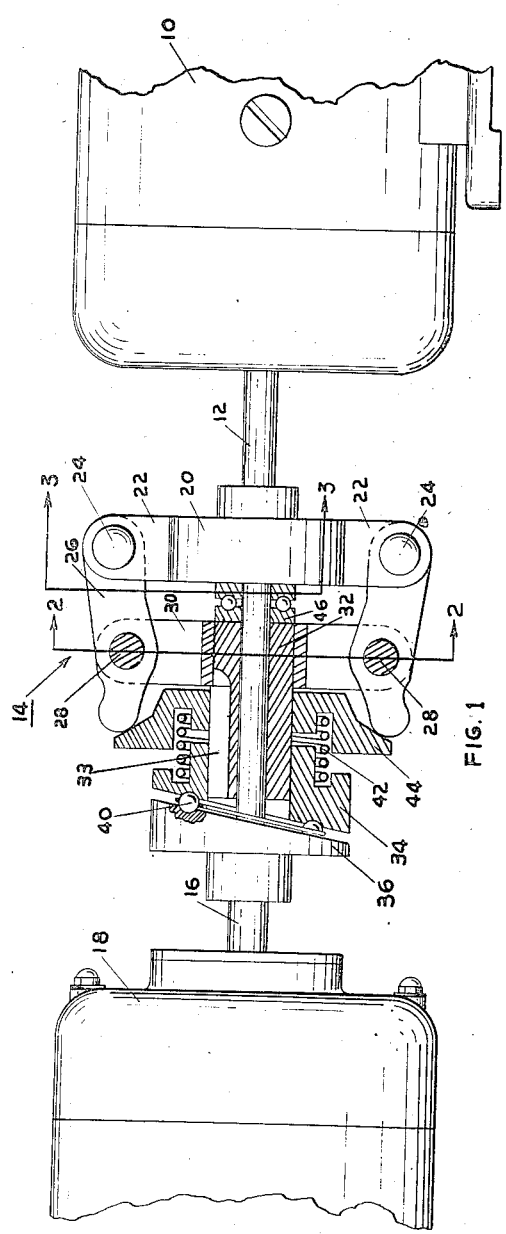
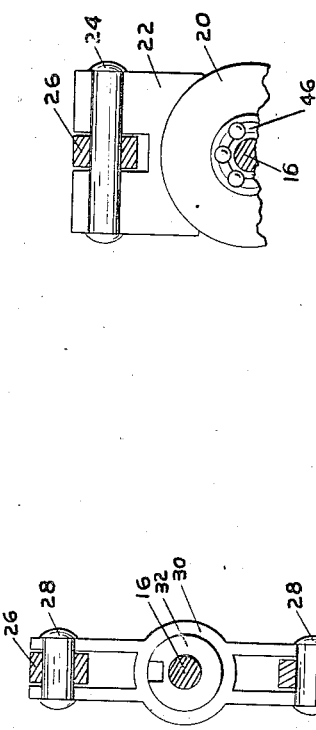
INVENTORS
JOSEPH NADER
JOSEPH F. MAILANDER
R. C. Lindberg
ATTORNEY Patented Dec. 7, 1948

2,455,435

UNITED STATES PATENT OFFICE 2,455,435

TORQUE AND SPEED RESPONSIVE MECHANISM

Joseph Nader and Joseph F. Mailander, Glen Ellyn, Ill.

Continuation of application Serial No. 500,958, September 2, 1943. This application April 4, 1945, Serial No. 586,508

9 Claims. (Cl. 192—54)

This invention relates in general to torque and speed responsive mechanism and relates in particular to the use of such mechanism in conjunction with electrical generating machinery where it is desired to maintain the voltage as constant as possible by controlling the speed thereof, and at the same time to make the machinery possible of supplying high currents as measured by the torque applied to the machine.

It is an object of the invention to provide an extremely simple speed and torque responsive mechanism.

Another object is to provide a torque and speed responsive mechanism which is responsive to the output torque of a driven machine in such a manner that the speed responsive portion thereof will not be entirely controlling when the torque demand increases beyond some predetermined value.

A further object of the invention is to provide a torque and speed responsive mechanism where the effect of the torque applied to a driven member is to negate or subtract from the effect of the speed responsive portion of the mechanism.

Yet another object is to provide in a torque and speed responsive mechanism a simple and efficient arrangement to increase the force transmitted by a clutch when the torque applied to a driven shaft is increased, at the same time providing for the control of speed of the driven shaft where the applied torque is below a predetermined amount.

Other objects and advantages of the invention will be apparent during the course of the description hereinafter. It is to be distinctly understood, however, that the invention is not limited in terms of the embodiment shown, which is for the purpose of illustrating the invention only, nor otherwise than by the spirit and scope of the claims appended hereto.

This application is a continuation of Nader, et al., application Serial No. 500,958, filed September 2, 1943, now abandoned.

In the drawings:

Figure 1 is a showing partly in elevation and partly in section of the invention where it is shown incorporated for use with a prime mover and a generator;

Figure 2 is a section taken on the lines 2—2 of Figure 1; and

Figure 3 is a section taken on the lines 3—3 of Figure 1.

As shown in Figure 1, a prime mover 10 is coupled in any convenient manner to a driving shaft 12, and through the medium of the torque and speed responsive mechanism, indicated generally by the ordinal 14, power is transmitted to a driven shaft 16, which is connected directly to a generator 18.

Means are provided for effecting a driving connection between the prime mover 10 and the generator 18, and as shown, the end of driving shaft 12 is provided with a driving drum 20, made of graphited bronze or the like, which is frictionally engaged by a pair of shoes 22 pivotally mounted on pins 24 to levers 26 pivoted at 28 to a yoke 30 which extends radially from a sleeve 32 rotatably mounted upon the driven shaft 16. The yoke 30 may be press fitted on sleeve 32 or shrunk thereto, or secured in any other convenient manner.

To effect a driving connection between the sleeve 32 and the driven shaft 16 a cam member 34 having a flat face at an oblique angle to the axis of shaft 16 is provided, which cooperates with a matching cam member 36 secured to the shaft 16 in any convenient manner. Cam member 34 is keyed to the sleeve 32 by means of key 33 but is adapted to move longitudinally with respect thereto. To minimize the friction between faces of cam members 34 and 36, a plurality of balls may be provided which may be retained in any conventional ball retainer secured to either cam member 34 or 36.

Means are provided to limit the outward movement of shoes 22 for effecting speed control of the driven shaft 16 and for increasing the pressure between shoes 22 and drum 20 when the torque applied to the driven shaft is increased. A helical spring 42 is held between cam member 34 and a cone member 44 secured to sleeve 32 by key 33 but free to move longitudinally thereon. The conical face of cone member 44 is in contact with the left end of levers 26, tending to rotate them in a direction by the bias of spring 42 to hold shoes 22 in engagement with drum 20.

For preventing the sleeve 32 from moving to the right a thrust bearing 46 mounted on the end of driven shaft 16 is provided, which abuts the right end of the sleeve 32 and the left face of drum 20.

The mechanism thus described operates as follows:

Rotation of the driving shaft 12 effects rotation of the driven shaft 16 through the medium of torque and speed responsive mechanism 14. The shoes 22 are constantly urged into contact with the drum 20 by the bias of spring 42 against the levers 26. However, as the speed of the driving shaft 12 increases beyond a predetermined amount, the levers 26 with their attendant shoes tend to rotate in a direction simultaneously to urge cone member 44 to the left against the bias of spring 42 and to lessen the pressure of shoes 22 against the drum 20.

When the torque delivered by the generator as measured by the output current exceeds some predetermined value, the bias of spring 42 will not be sufficient to prevent cam member 34 from rotating relatively to cam member 36. When such relative rotation takes place, the cams will separate and one of the balls 46 retained between the faces of members 34 and 36 will take the thrust. Simultaneously, the bias of spring 42 increases to urge cone member 44 to the right to increase the pressure of shoes 22 against drum 20.

Thus has been described an extremely simple and efficient mechanism which is both torque and speed responsive. While the invention has been described in terms of a preferred embodiment thereof, it is not limited except by the spirit and scope of the claims hereto appended.

We claim:

1. A torque and speed responsive mechanism comprising a driving shaft, a driven shaft, a drum supported by said driving shaft, a cam member secured to the driven shaft and having a cam face at an oblique angle to the axis of said shaft, a sleeve supported by said driven shaft, a second cam member secured to said sleeve and having an oblique face cooperating with the first said cam face, a yoke extending radially from said sleeve, levers pivotally supported by said yoke, shoes mounted at the ends of said levers for engagement with said drum, a conical shaped cam member secured to said sleeve in engagement with the other ends of said levers, and means intermediate the second named cam member and the conical shaped cam member for urging said shoes into firmer contact with said drum.

2. A torque and speed responsive mechanism comprising a driving shaft, a driven shaft, a drum supported by said driving shaft, a cam member secured to the driven shaft and having a cam face at an oblique angle to the axis of said shaft, a sleeve supported by said driven shaft, a second cam member secured to said sleeve and having an oblique face cooperating with the first said cam face, a yoke extending radially from said sleeve, a lever pivotally supported by said yoke, a shoe mounted at one end of said lever for engagement with said drum, a conical shaped cam member secured to said sleeve in engagement with the other end of said lever, and means intermediate the second named cam member and the conical shaped cam member for urging said shoe into firmer contact with said drum, said lever being adapted to move with said shoe to decrease the pressure against said drum when the speed of said driven shaft increases beyond a predetermined amount.

3. A torque and speed responsive mechanism comprising a driving shaft, a driven shaft, a drum supported by said driving shaft, a cam member secured to the driven shaft and having a cam face at an oblique angle to the axis of said shaft, a sleeve supported by said driven shaft, a second cam member secured to said sleeve and having an oblique face cooperating with the first cam face, a yoke extending radially from said sleeve, a lever pivotally supported by said yoke, a shoe mounted at one end of said lever for engagement with said drum, a conical shaped cam member secured to said sleeve in engagement with the other end of said lever, spring means intermediate the second named cam member and the conical shaped cam member for increasing the pressure between said shoe and said drum when relative rotation takes place between the first named cam member and the second named cam member.

4. A torque and speed responsive mechanism comprising a driving shaft, a driven shaft, a drum supported by said driving shaft, a cam member secured to the driven shaft and having a cam face at an oblique angle to the axis of said shaft, a sleeve supported by said driven shaft, a second cam member secured to said sleeve and having an oblique face cooperating with the first said cam face, a yoke extending radially from said sleeve, a lever pivotally supported by said yoke, a shoe mounted at one end of said lever for engagement with said drum, the speed of rotation of said driven shaft in excess of a predetermined amount being adapted to reduce the pressure of said shoe against said drum, a conical shaped cam member secured to said sleeve in engagement with the other end of said lever, a spring intermediate the second named cam member and the conical shaped cam member for increasing the pressure between said shoe and said drum when relative rotation takes place between the first named cam member and the second named cam member.

5. A torque and speed responsive mechanism comprising a driving shaft, a driven shaft, a drum supported by said driving shaft, a cam member secured to the driven shaft and having a cam face at an oblique angle to the axis of said shaft, a second cam member secured to said sleeve and having an oblique face cooperating with the first said cam face, a yoke extending radially from said sleeve, a lever pivotally supported by said arm, a shoe mounted at one end of said lever for engagement with said drum, the speed of rotation of said driven shaft in excess of a predetermined amount being adapted to reduce the pressure of said shoe against said drum, a conical shaped cam member secured to said sleeve in engagement with the other end of said lever, a spring intermediate the second named cam member and the conical shaped cam member for increasing the pressure between said shoe and said drum when relative rotation takes place between the first named cam member and the second named cam member upon increase of torque applied to the said driven shaft.

6. A torque and speed responsive mechanism comprising a driving member, a driven member, means responsive to the speed of the driven member for varying the force transmitted by the driving member to the driven member, a cam supported by said driven member, a second cam cooperating with said first cam, a third cam in cooperation with said speed responsive means, and means spacing said second and third cams for varying the force transmitted from the driving member to the driven member.

7. A torque and speed responsive mechanism comprising a driving member, a driven member, means responsive to the speed of the driven member for varying the force transmitted by the driving member to the driven member, a cam supported by said driven member, a second cam cooperating with the first cam, a third cam in cooperation with said speed responsive means, and resilient means spacing said second and third cams for varying the force transmitted from the driving member to the driven member.

8. A torque and speed responsive mechanism comprising a driving member, a driven member, speed responsive means supported by the driven member for varying the force transmitted by the driving member to the driven member, a cam member supported by said driven member, a second cam member cooperating therewith, a third cam member in contact with said speed responsive means, and means spacing said second and third cam members for varying the force transmitted from the driving member to the driven member according to the torque demand upon said driven member.

9. A torque and speed responsive mechanism comprising a driving shaft, a driven shaft, speed responsive means supported by the driven shaft for varying the force transmitted by the driving shaft to the driven shaft, a cam member supported by said driven shaft, a second cam member cooperating therewith, a third cam member in contact with said speed responsive means, and resilient means spacing said second and third cam members for varying the force transmitted from the driving shaft to the driven shaft according to the torque demand upon said driven shaft.

JOSEPH NADER.
JOSEPH F. MAILANDER.

REFERENCES CITED

The following references are of record in the file of this patent:

UNITED STATES PATENTS

| Number | Name | Date |
|---|---|---|
| 462,028 | Ballard | Oct. 27, 1891 |
| 1,720,962 | MacBlane | July 16, 1929 |
| 1,741,251 | Schneider | Dec. 31, 1929 |
| 1,841,284 | Gillett | Jan. 12, 1932 |